(12) United States Patent
Myeong et al.

(10) Patent No.: US 8,467,902 B2
(45) Date of Patent: Jun. 18, 2013

(54) METHOD AND APPARATUS FOR ESTIMATING POSE OF MOBILE ROBOT USING PARTICLE FILTER

(75) Inventors: Hyeon Myeong, Suwon-si (KR); Woo-Yeon Jeong, Seoul (KR); Seok-Won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1297 days.

(21) Appl. No.: 12/155,552

(22) Filed: Jun. 5, 2008

(65) Prior Publication Data
US 2009/0024251 A1 Jan. 22, 2009

(30) Foreign Application Priority Data
Jul. 18, 2007 (KR) .................. 10-2007-0071791

(51) Int. Cl.
*G05B 15/00* (2006.01)
*G05B 19/00* (2006.01)
(52) U.S. Cl.
USPC ........... 700/258; 700/245; 700/250; 700/253; 700/255; 700/259
(58) Field of Classification Search
None
See application file for complete search history.

(56) References Cited

U.S. PATENT DOCUMENTS

| | | | | |
|---|---|---|---|---|
| 5,109,425 A * | 4/1992 | Lawton | .......................... | 382/107 |
| 5,144,685 A * | 9/1992 | Nasar et al. | .................... | 382/153 |
| 5,911,767 A * | 6/1999 | Garibotto et al. | ............... | 701/28 |
| 6,459,955 B1 * | 10/2002 | Bartsch et al. | ................. | 700/245 |
| 7,015,831 B2 | 3/2006 | Karlsson et al. | ........... | 340/995.1 |
| 7,135,992 B2 * | 11/2006 | Karlsson et al. | ........... | 340/995.1 |
| 7,145,478 B2 * | 12/2006 | Goncalves et al. | ........ | 340/995.1 |
| 7,162,338 B2 * | 1/2007 | Goncalves et al. | ............. | 701/23 |
| 7,166,832 B2 * | 1/2007 | Takenaka | ....................... | 250/221 |
| 7,177,737 B2 * | 2/2007 | Karlsson et al. | ................ | 701/23 |
| 7,272,467 B2 * | 9/2007 | Goncalves et al. | ........... | 700/245 |
| 7,280,434 B2 * | 10/2007 | Wang et al. | .................... | 367/118 |
| 7,689,321 B2 * | 3/2010 | Karlsson | ....................... | 700/253 |

(Continued)

FOREIGN PATENT DOCUMENTS

| | | |
|---|---|---|
| JP | 2006-139753 | 6/2006 |
| KR | 10-2004-0071999 | 8/2004 |
| KR | 10-2006-0085751 | 7/2006 |
| KR | 10-2007-0026912 | 3/2007 |

OTHER PUBLICATIONS

Grisetti, G. et al., Fast and Accurate SLAM with Rao-Blackwellized Particle Filters, Elsevier Science, Oct. 10, 2006 (16 pages).

(Continued)

*Primary Examiner* — Khoi Tran
*Assistant Examiner* — Bhavesh V Amin
(74) *Attorney, Agent, or Firm* — Staas & Halsey LLP (57) ABSTRACT

A method and apparatus for estimating the pose of a mobile robot using a particle filter is provided. The apparatus includes an odometer which detects a variation in the pose of a mobile robot, a feature-processing module which extracts at least one feature from an upward image captured by the mobile robot, and a particle filter module which determines current poses and weights of a plurality of particles by applying the mobile robot pose variation detected by the odometer and the feature extracted by the feature-processing module to previous poses and weights of the particles.

20 Claims, 8 Drawing Sheets
(2 of 8 Drawing Sheet(s) Filed in Color)

U.S. PATENT DOCUMENTS

| | | | |
|---|---|---|---|
| 2003/0007682 A1* | 1/2003 | Koshizen et al. | 382/157 |
| 2004/0167667 A1* | 8/2004 | Goncalves et al. | 700/245 |
| 2004/0167669 A1* | 8/2004 | Karlsson et al. | 700/259 |
| 2004/0167670 A1* | 8/2004 | Goncalves et al. | 700/259 |
| 2004/0167688 A1* | 8/2004 | Karlsson et al. | 701/23 |
| 2004/0167716 A1* | 8/2004 | Goncalves et al. | 701/217 |
| 2005/0182518 A1* | 8/2005 | Karlsson | 700/253 |
| 2005/0213431 A1* | 9/2005 | Wang et al. | 367/118 |
| 2006/0006316 A1* | 1/2006 | Takenaka | 250/221 |
| 2006/0253224 A1* | 11/2006 | Tani et al. | 700/245 |

OTHER PUBLICATIONS

Office Action dated Jul. 9, 2008 in corresponding Korean Patent Application No. 10-2007-0071791 (4 pp).

Matas, J. et al., *Robust Wide Baseline Stereo from Maximally Stable Extremal Regions*, British Machine Vision Conference, BMVC 2002, pp. 384-393.

* cited by examiner

METHOD AND APPARATUS FOR ESTIMATING POSE OF MOBILE ROBOT USING PARTICLE FILTER

CROSS-REFERENCE TO RELATED APPLICATION

This application claims priority from Korean Patent Application No. 10-2007-0071791 filed on Jul. 18, 2007 in the Korean Intellectual Property Office, the disclosure of which is incorporated herein by reference in its entirety.

BACKGROUND OF THE INVENTION

1. Field of the Invention

The present invention relates to an apparatus and method for estimating the pose of a mobile robot, and, more particularly, to an apparatus and method for estimating the pose of a mobile robot using a particle filter.

2. Description of the Related Art

Recently, various types of robots for use in industry, homes and businesses, such as cleaning robots, guidance robots and security robots, have been commercialized.

Robots can perform functions while autonomously traveling within a given space. In order for a robot to perform functions while traveling in a given environment, a map of the robot's surrounding needs to be provided, and information regarding the position and the heading angle of the robot is required. Simultaneous Localization and Mapping (SLAM) algorithms may be used to construct a map and to locate the robot.

SLAM algorithms are characterized by repeatedly updating the map of a robot's surroundings, and determining the position of the robot with reference to the map.

SLAM algorithms may use a particle filter technique for locating a robot. The particle filter technique involves configuring a plurality of samples regarding the position and the heading angle of a robot, calculating the probabilities of the samples and estimating the optimum pose of the robot based on the results of the calculation. The term "pose" as used herein denotes the position and the heading angle of an object in a 2-dimensional (2D) coordinate system.

SLAM algorithms may be classified into SLAM algorithms using feature points and SLAM algorithms using raw data such as range data.

SLAM algorithms using feature points may be inefficient because it is generally difficult to extract corner points. Thus, SLAM algorithms using feature points may result in errors, especially when used in an environment lacking prominent feature points. For example, it is difficult to extract corner points from a room with a white ceiling and white ceiling lights since it is difficult to distinguish the white ceiling from the white ceiling lights.

SLAM techniques using feature points may involve determining whether current feature points are identical to previous feature points. However, it is difficult to determine whether current feature points are identical to previous feature points, especially in the presence of a data-association-error accumulation.

When a robot continuously moves and thus the pose of the mobile robot changes, an error between the pose of the mobile robot estimated by an odometer and the actual pose of the mobile robot may become greater than a predefined threshold. For example, when a mobile robot travels on a carpeted floor or on a slippery floor, the estimated pose may deviate considerably from the actual pose of the mobile robot.

Therefore, what is needed is a pose-estimation device which can be embedded in a mobile robot, and can effectively estimate, using a small amount of memory, the pose of the mobile robot regardless of an odometer error and the difficulty of extracting feature points.

SUMMARY OF THE INVENTION

Aspects of the present invention provide reducing the amount of memory usage and the amount of computation by sharing feature data using a particle filter.

Aspects of the present invention also provide accurately estimating the pose of a mobile robot regardless of an error such as a floor slip, by variably adjusting the noise covariance of particles.

Aspects of the present invention also provide accurately estimating the pose of a mobile robot by performing feature matching using various features such as feature points or lines with multiple feature points.

However, the aspects of the present invention are not restricted to those set forth herein. The above and other aspects of the present invention will become apparent to one of ordinary skill in the art to which the present invention pertains by referencing a detailed description of the present invention given below.

According to an aspect of the present invention, there is provided an apparatus for estimating a pose of a mobile robot, the apparatus including: an odometer which detects a variation in the pose of a mobile robot; a feature-processing module which extracts at least one feature from an upward image captured by the mobile robot; and a particle filter module which determines current poses and weights of a plurality of particles by applying the mobile robot pose variation detected by the odometer and the feature extracted by the feature-processing module to previous poses and weights of the particles.

According to another aspect of the present invention, there is provided a method of estimating a pose of a mobile robot, the method including: detecting a variation in the pose of a mobile robot; extracting at least one feature from an upward image captured by the mobile robot; and determining current poses and weights of particles by applying the detected mobile robot pose variation and the extracted feature to previous poses and weights of the particles.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects and features of the present invention will become apparent by describing in detail exemplary embodiments thereof with reference to the attached drawings, in which.

DETAILED DESCRIPTION OF THE EXEMPLARY EMBODIMENTS

The present invention will now be described more fully with reference to the accompanying drawings, in which exemplary embodiments of the invention are shown.

Figure 1:
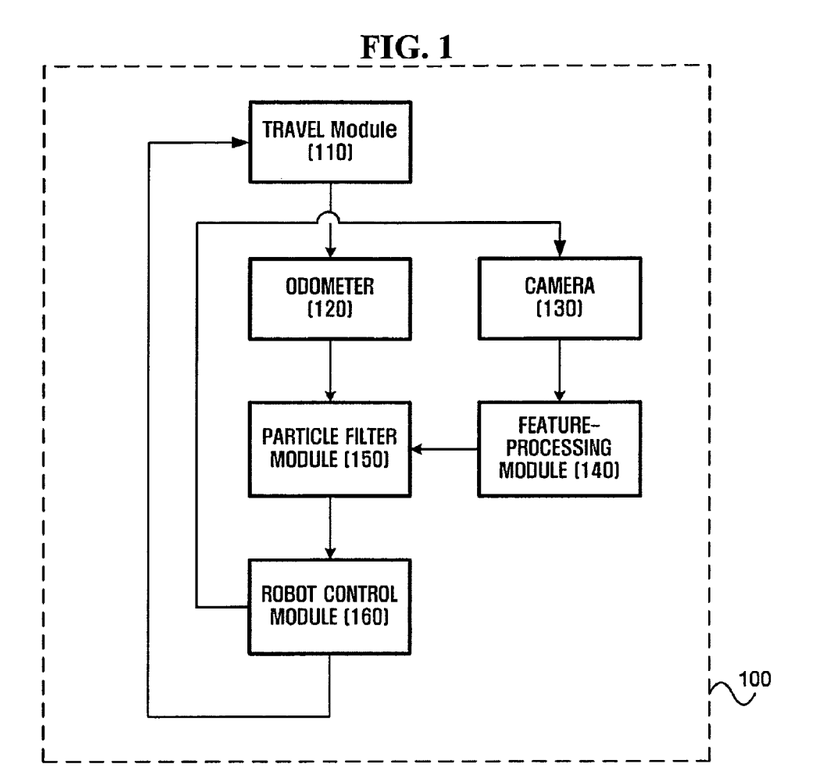
FIG. 1 is a block diagram of an apparatus for estimating the pose of a mobile robot using a particle filter, according to an embodiment of the present invention.

FIG. 1 is a block diagram of an apparatus for estimating the pose of a mobile robot using a particle filter, according to an embodiment of the present invention. Referring to FIG. 1, a travel module 110 enables a mobile robot 10 to move. The travel module 110 may include a driving unit for providing driving power and at least one wheel or a track which is rotated by the driving unit.

An odometer 120 is mounted on the mobile robot 100 and detects the amount of movement and rotation of the mobile robot 100. Examples of the odometer 120 include an encoder and a gyroscope. For example, the pose of the mobile robot 100 may be estimated by integrating the distance traveled by the mobile robot 100 and the travel direction of the mobile robot 100 with the use of an encoder. If no integration error exists, the pose of the mobile robot 100 may be accurately estimated simply using an encoder. An encoder can provide relatively accurate pose estimates when the distance traveled by the mobile robot 100 is relatively short. However, as the mobile robot 100 continues moving, an integration error accumulates. In addition, there is always a probability of the mobile robot 100 slipping on the floor or encountering an obstacle while travelling from one place to another. Given all this, the position of the mobile robot 100 estimated by an encoder may deviate from an actual position of the mobile robot 100.

The departure point of the mobile robot 100 and the heading angle of the mobile robot 100 at time of departure may be set as reference values. Since the pose of the mobile robot 100 indicates both the position and the heading angle of the mobile robot 100 on a two-dimensional (2D) plane, estimation of the pose of the mobile robot 100 includes estimation of the position and the heading angle of the mobile robot 100. The pose of the mobile robot 100 may be estimated with reference to features on a map. The pose of the mobile robot 100 may be interpreted as the position and the heading angle of the mobile robot 100 with respect to a feature that is recognized by the mobile robot 100. Thus, an accurate estimation of the pose of the mobile robot 100 may be interpreted as an accurate estimation of the position of a feature that is recognized by the mobile robot 100. Features are basic information necessary for creating a map. Features may include typical feature points and lines with multiple feature points.

A camera 130 captures an image of the surroundings of the mobile robot 100 and converts the captured image into a digital signal. The camera 130 may include a charge coupled device (CCD) module or a complementary metal oxide semiconductor (CMOS) module. The camera 130 is attached to the mobile robot 100, and captures an image (hereinafter referred to as "upward image") of an area vertically above a plane on which the mobile robot 100 travels.

A robot control module 160 controls the travel module 120 and the camera 130 of the mobile robot 100. The robot control module 160 may control the movement of the mobile robot 100 so that the mobile robot 100 can build a map while travelling from one place to another. Also, the robot control module 160 may control an image-capture operation of the camera 130.

A feature-processing module 140 obtains a number of features from an image captured by the camera 130, and converts the features into coordinate data. The camera 130 captures an upward image, and the feature-processing module 140 processes a number of features using the upward image.

A particle filter module 150 estimates the pose of the mobile robot 100 using a plurality of particles. Particles are hypothesized samples that are virtually created around the mobile robot 100. In general, in order to estimate the pose of the mobile robot 100, more than one particle may be disposed around the mobile robot 100. The particle filter module 150 may create a plurality of particles, select only a few particles that can relatively accurately reflect the pose of the mobile robot 100 through resampling, and estimate the pose of the mobile robot 100 using the selected particles. Since features are the basis of map construction, it is possible to effectively create a map by accurately estimating features.

Figure 2:
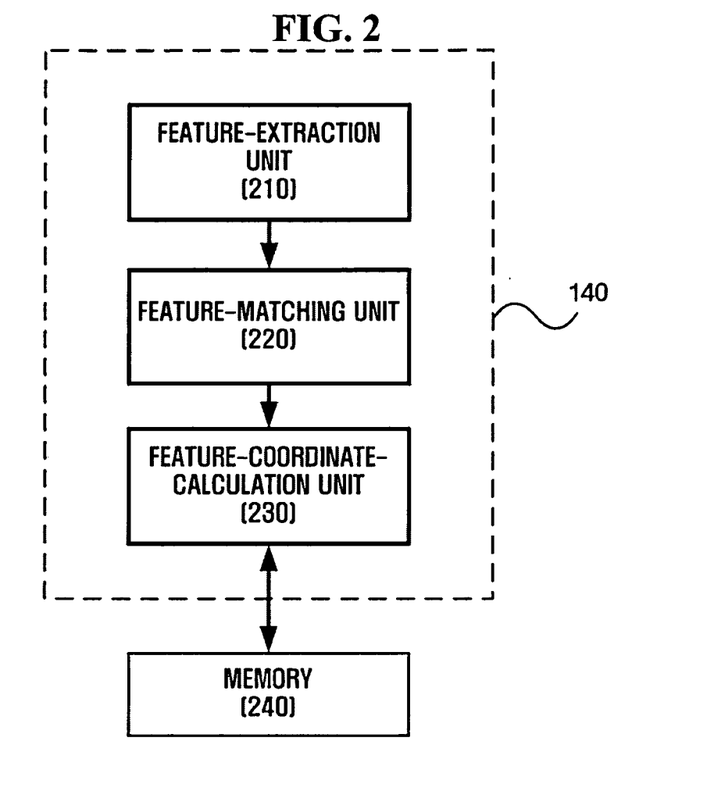
FIG. 2 is a detailed block diagram of the feature-processing module illustrated in FIG. 1.

FIG. 2 is a detailed block diagram of the feature-processing module 140 illustrated in FIG. 1. The feature-processing module 140 extracts at least one feature from an upward image captured by the camera 130, and determines whether the feature is new. The upward image is an image of an area vertically above the mobile robot 130.

Examples of features include feature points (such as the edges or corners of an object) which can help visualize the shape of an object. Feature points are the basis of map construction and are also referred to as landmarks. As the mobile robot 100 travels, feature points may become larger or smaller or may rotate with respect to other feature points.

Given that it is difficult sometimes to extract feature points from an image, lines or points that form the contour of a closed region may be extracted from an image as features. For example, lines or points that form the contour of a ceiling light may be extracted from an image of a ceiling as features.

Referring to FIG. 2, the feature-processing module 140 may include a feature-extraction unit 210, a feature-matching unit 220, and a feature-coordinate-calculation unit 230.

The feature-extraction unit 210 extracts at least one feature from an image captured by the camera 130.

Feature points may be sorted out from features using the Harris corner-detection method. The Harris corner-detection method is disclosed in C. J. Harris, M. Stephens, "A Combined Corner and Edge Detector," In Proc. $4^{th}$ Alvey Vision Conf., Manchester, 1988. According to this corner-detection method, a point having a corner response R greater than 0 and which is a local maximum may be determined as a corner point or a feature point, as indicated by Equation (1):

$$R = \det(M) - k(tr(M))^2, \quad (1)$$

where M indicates a matrix that can represent a variation in the intensity of an image and k indicates a coefficient.

Alternatively, feature points may be sorted from features using a split-and-merge algorithm. The split-and-merge algorithm is characterized by detecting extreme points, fitting a line that passes through a number of extreme points, splitting a line into one or more fine lines if points that are distant from the line by more than a predefined error value are encountered, and merging a group of adjacent lines if they can be recognized as a single line. Therefore, according to the split-and-merge algorithm, it is possible to extract not only the outlines of objects in an image but also corners or edges and use the extracted corners or edges as feature points.

Features with multiple feature points or lines may be extracted using a Maximally Stable Extremal Region (MSER) Technique. The MSER technique is classified by detecting an extremal region or a distinguished region and defining the distinguished region as an MSER if the distinguished region has a local minimum.

A contour may be extracted from a closed region obtained using the MSER technique. Then, a line or a corner point may be extracted from the contour. For example, a rectangular contour may be extracted from a rectangular ceiling light using the MSER technique, and four lines or four points may be extracted from the rectangular contour.

In short, by extracting a contour using the MSER technique, and then extracting lines or points from the contour as features, it is possible to provide more stable line-extraction results compared to when using a typical line extraction technique. Feature matching simply using contours may result in long computation times and low-precision results because the size of contours is generally larger than the size of points or lines. However, by extracting lines or points from a contour, it is possible to reduce the size of data that needs to be compared, and thus to reduce the time taken to perform computation.

The MSER technique is disclosed in "Robust Wide Baseline Stereo from Maximally Stable Extremal Regions" by J. Matas, O. Chun, M. Urban, and T. Pajdla, British Machine Vision Conference, BMVC 2002.

The feature-extraction unit 210 extracts at least one feature, which is the basis of map building, from an image captured by the mobile robot 100. Examples of the feature include not only feature points but also lines with multiple feature points.

The feature-matching unit 220 compares a current feature with a previous feature present in a memory 240, and determines whether the current feature is identical to the previous feature. The feature-matching unit 220 may perform such feature matching operation for each particle in order to provide the particle filter module 150 with feature information. Specifically, if a feature extracted at a time t is identical to a feature extracted at time t−1, the feature-matching unit 220 may store the feature extracted at time t in the memory 240 so that the feature extracted at time t−1 can be updated with the feature extracted at time t. In contrast, if the feature extracted at time t is not identical to the feature extracted at time (t−1), the feature-matching unit 220 may store the feature extracted at time t in the memory 240 as a new feature. The feature-matching unit 220 may determine whether a current feature is identical to a previous feature by using a number of local images shared between a plurality of particles.

Figure 3:
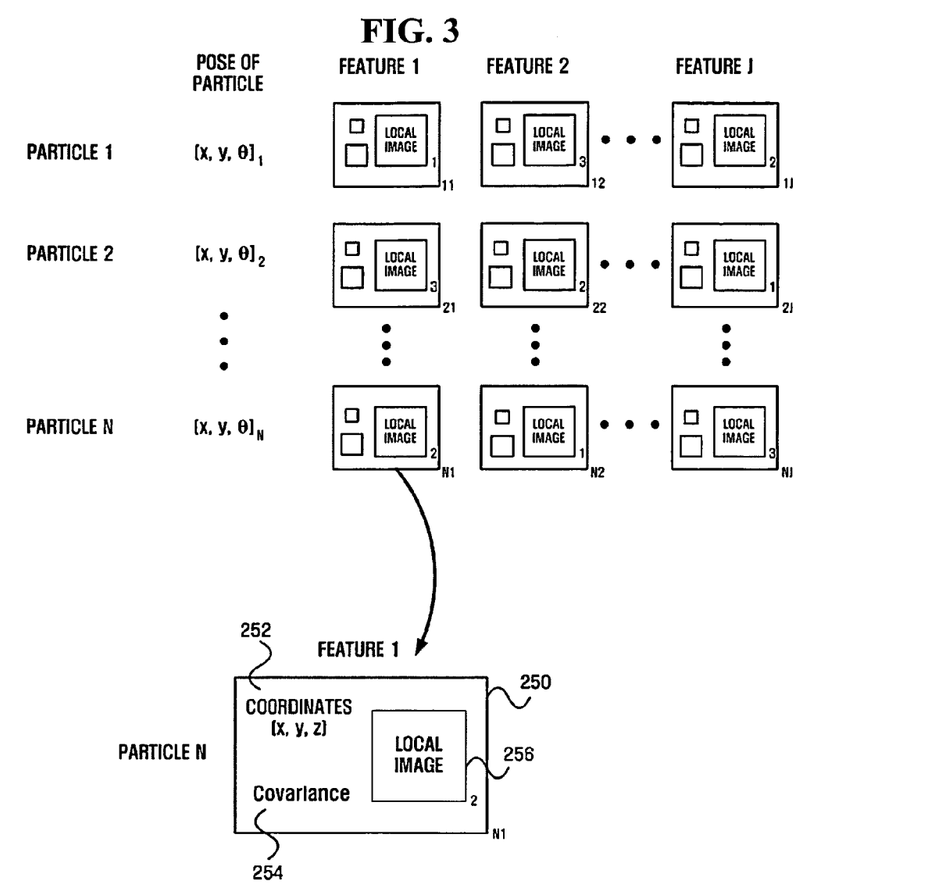
FIG. 3 illustrates a data structure including feature information stored in the apparatus illustrated in FIG. 1.

FIG. 3 illustrates a data structure 250 in which feature information is stored by the apparatus illustrated in FIG. 1. Referring to FIG. 3, the data structure 250 includes feature coordinates 252, a feature covariance 254, and a local image 256. For a feature that is not a point but a line, the data structure 250 may include a beginning point and an end point of the feature or the angle and the distance between the feature and the center of an image from which the feature originates, instead of the feature coordinates 252. For a feature that is a concentric circle, the data structure 250 may include the coordinates of the center of the concentric circle or the radius of the concentric circle.

The coordinates of a feature indicate the position of a feature extracted from an image captured by the camera 130. The coordinates of a feature may be 2D coordinates in an image coordinate system or three-dimensional (3D) coordinates obtained by converting the coordinates in the image coordinate system to a reference coordinate system.

A covariance Σ of a feature indicates the degree of uncertainty associated with the position of a feature extracted from an image captured by the camera 130. The covariance Σ can be represented by Equation (2):

$$\sum = \begin{bmatrix} \sum_{xx} & \sum_{xy} & \sum_{xz} \\ \sum_{yz} & \sum_{yy} & \sum_{yz} \\ \sum_{zx} & \sum_{zy} & \sum_{zz} \end{bmatrix}. \quad (2)$$

It may be determined whether features are identical to each other within the above-described covariance range.

The apparatus illustrated in FIG. 1 may store a plurality of features for each particle, and obtain as many local images 256 as there are features. A local image 256 may be a portion of an image captured by the camera 130 and include a feature. For example, a 20×20 image including a feature may be cut out from an image captured by the camera 130, and may be stored as a local image 256.

In order to determine whether a feature extracted at time t is identical to a feature extracted at time t-m (m is the positive integer), the coordinates of the feature extracted at time t may be compared with the coordinates of the feature extracted at time t-m. If the coordinates of the feature extracted at time t are within a predetermined range of the coordinates of the feature extracted at time t-m, a first local image A including the feature extracted at time t may be compared to a second local image B including the feature extracted at time t-m.

That is, it is determined whether the feature extracted at time t is identical to the feature extracted at time t-m based on the correlation between the first local image A and the second local image B. For example, a normalized correlation NC(A, B) between the first local image A and the second local image B may be represented by Equation (3):

$$NC(A, B) = \frac{\sum_{i,j} A_{i,j} B_{i,j}}{\sqrt{\sum_{i,j} A_{i,j} A_{i,j} \cdot \sum_{i,j} B_{i,j} B_{i,j}}} \quad (3)$$

where $A_{i,j}$ indicates the intensity of a pixel (i,j) of the first local image A and $B_{i,j}$ indicates the intensity of a pixel (i,j) of the second local image B. The higher the normalized correlation NC(A,B) between the first local image A and the second local image B, the more likely the first local image A and the second local image B share the same feature.

Particles may share the same local image 256 for a given feature. Referring to FIG. 3, if there are J features extracted, J local images respectively corresponding to the J features may be stored in the memory 240. If there are N particles, a total of N×J local images may be stored in the memory 240. According to an embodiment of the present invention, the N particles share the same local image for each of the J features, thereby reducing the number of local images that need to be stored in the memory 240 to J.

In this manner, it is possible to considerably reduce the amount of computation by skipping the calculation of a correlation coefficient for each of a plurality of particles using a number of local images shared between the particles.

Figure 4A:
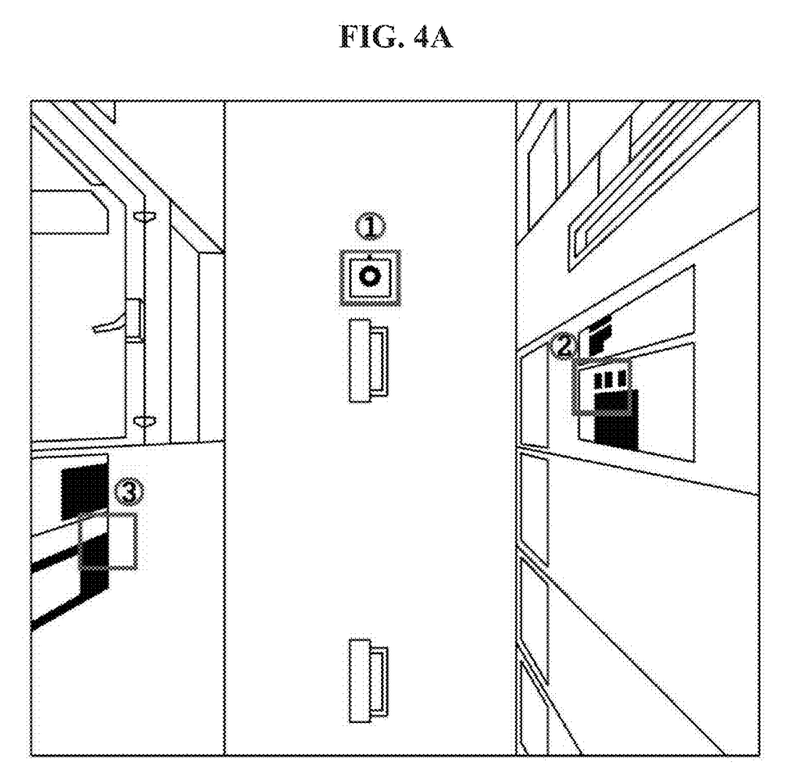
FIG. 4A shows an upper image captured by the apparatus illustrated in FIG. 1.
Figure 4B:
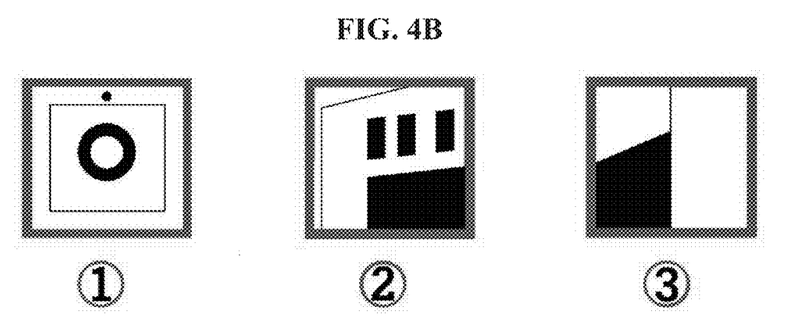
FIG. 4B shows three local images respectively including three features extracted from the upper image of FIG. 4A.

FIG. 4A shows an upper image captured by the apparatus illustrated in FIG. 1, and FIG. 4B shows three local images respectively including three features extracted from the upper image of FIG. 4A.

Referring to FIG. 4A, the feature-extraction unit 210 may extract more than one feature from an upward image captured by the camera 130. For example, the feature-extraction unit 210 may extract three features from the upward image of FIG. 4A, and obtain three local images respectively including the extracted three features, as shown in FIG. 4B. The feature-extraction unit 210 may obtain a local image by selecting a predefined number of pixels of an upward image including a feature. Local images may be used to determine whether a feature in a current upward image is identical to a feature in a previous upward image.

Referring to FIGS. 4A and 4B, the three local images may be respectively indexed by index values of 1, 2, and 3, and may be shared between a plurality of particles. If each of a plurality of particles includes J features, three of the J features may have one of the three local images respectively referenced by the index values of 1, 2, and 3, as illustrated in FIG. 3.

In this manner, when there are J local images respectively corresponding to J features, it is possible to reduce the amount of memory usage by sharing the J local images between a plurality of particles, instead of storing the J local images for each of the particles or storing other local images.

Referring to FIG. 2, the feature-coordinate-calculation unit 230 determines the position of a feature when the mobile robot 100 moves from a previous position $P_1$ to a current position $P_2$ in a reference coordinate system. Specifically, the mobile robot 100 may determine a feature position $L_1$ in an upward image captured from a previous temporal position $P_1$ and a feature position $L_1$ in an upward image captured from a previous temporal position $P_1$ using an image coordinate system. The reference coordinate system is used to build a map, whereas the image coordinate system is referenced by upward images captured by the camera 130. The feature-coordinate-calculation unit 230 may determine the position of a feature by converting the 2D coordinates of the feature in the image coordinate system to 3D coordinates in the reference coordinate system. The conversion of the coordinates of a feature in an upward image into 3D coordinates is disclosed in Korean Patent Laid-Open Publication No. 2006-0085751.

As described above, a map may be built by determining the positions of features using the feature-coordinate-calculation unit 230. The feature-coordinate-calculation unit 230 may effectively build a map based on features by continuously updating the features using upward images captured by the mobile robot 100 while traveling from one place to another.

Figure 5:
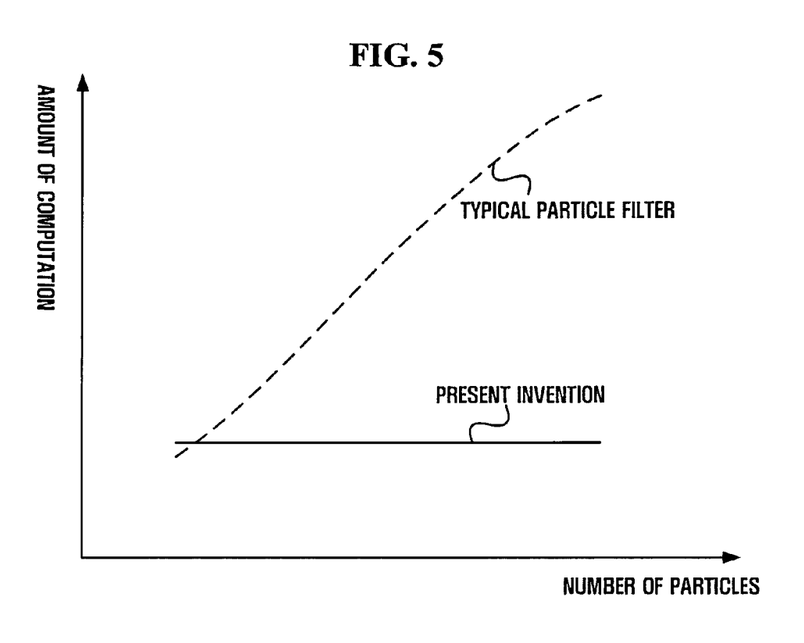
FIG. 5 is a graph comparing the amount of computation of the apparatus illustrated in FIG. 1 with the amount of computation of a typical particle filter.

FIG. 5 is a graph comparing the amount of computation of the apparatus illustrated in FIG. 1 with the amount of computation of a typical particle filter. Referring to FIG. 5, the amount of computation of the apparatus illustrated in FIG. 1 is uniformly maintained regardless of the number of particles because the apparatus illustrated in FIG. 1 shares a number of local images between a plurality of particles and thus the number of local images does not increase regardless of an increase in the number of particles. However, the amount of computation of the filter-based apparatus may increase if the number of features increases.

In contrast, a feature-matching unit of a typical particle filter extracts feature information in order to determine whether features are identical to each other. For example, a feature-matching unit of a typical particle filter compares scale invariant feature transform (SIFT) features having different orientations and vectors for different particles. Thus, as the number of particles increases, the number of SIFT features gradually increases, and the amount of computation also increases.

In short, according to the embodiment of FIG. 1, it is possible to considerably reduce the amount of memory usage and the amount of computation by sharing a number of local images regarding features between a plurality of particles. Therefore, the embodiment of FIG. 1 may be suitable for realizing an embedded system that can be installed in mobile robot.

Figure 6:
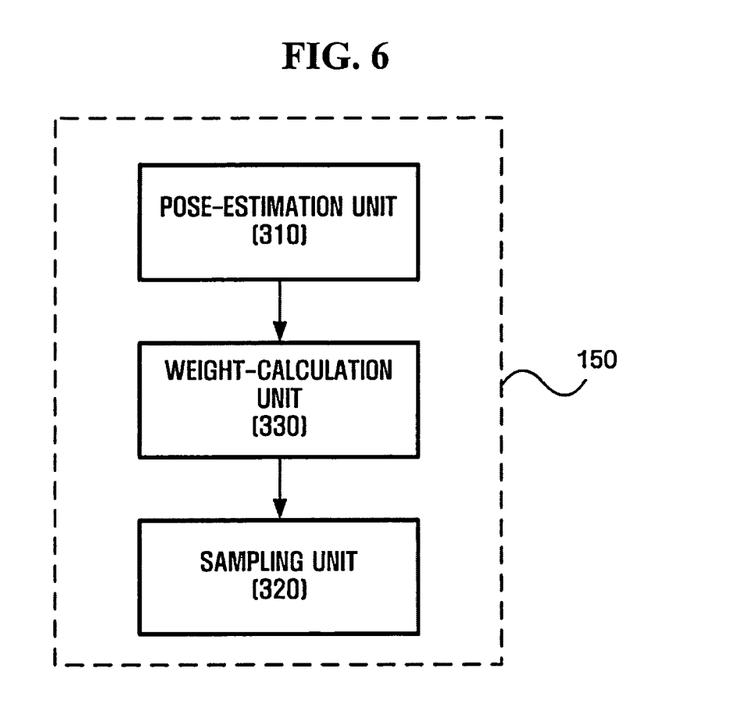
FIG. 6 is a detailed block diagram of the particle filter module illustrated in FIG. 1.

FIG. 6 is a block diagram of the particle filter module 150 illustrated in FIG. 1. Referring to FIG. 6, the particle filter module 150 includes a pose-estimation unit 310, a sampling unit 320, and a weight-calculation unit 330.

The particle filter unit 150 calculates a weight regarding the position and the direction of the mobile robot 100, i.e., a weight regarding the pose of the mobile robot 100, using the properties of features provided by the feature-processing module 140, and estimates an optimum pose of the mobile robot 100 using the weight. The higher the accuracy of estimation of the pose of the mobile robot 100, the higher the weight regarding the pose of the mobile robot 100.

The pose-estimation unit 310 may represent the pose of the mobile robot 100 that varies according to the movement of the mobile robot 100 using a probability distribution p. The probability distribution p may be calculated using data of a previous step (at time t−1) and data of a current step (at time t), as indicated by Equation (4):

$$p(x_t^{(i)} \mid m_{t-1}^{(i)}, x_{t-1}^{(i)}, z_t, u_t) = \frac{p(z_t \mid m_{t-1}^{(i)}, x_t^{(i)}) p(x_t^{(i)} \mid x_{t-1}^{(i)}, u_t)}{\int p(z_t \mid m_{t-1}^{(i)}, x') p(x' \mid x_{t-1}^{(i)}, u_t) dx'} \quad (4)$$

where $x_{t-1}$ indicates the pose of the mobile robot 100 at time t−1, $u_t$ indicates data detected at time t by the odometer 120, $x_t$ indicates the pose of the mobile robot 100 at time t, $m_{t-1}$ indicates map data corresponding to the time t−1, and $z_t$ indicates data obtained from an image captured at time t. The probability distribution p is the distribution of probabilities regarding the pose of the mobile robot 100 at time t after the mobile robot 100 moves from $x_{t-1}$ to $x_t$ with dynamic noise present therein or with other uncertain factors present in a system.

The pose-estimation unit 310 may calculate the probability of the pose of the mobile robot 100 by using Equation 4 as it is or by approximating Equation 4.

The pose-estimation unit 310 may determine the pose of the mobile robot 100 at time t using the odometer 120 before calculating the probability of the pose of the mobile robot 100. However, the estimation of the pose of the mobile robot 100 by the odometer 120 may not be able to produce accurate results especially when the mobile robot 100 slips on the floor.

If the difference between a variation in the pose of the mobile robot 100 detected between the time t−1 and time t by the odometer 120 and a variation in the pose of the mobile robot 100 estimated through feature matching is greater than a predetermined threshold, a noise covariance NC of a particle may be calculated, as indicated by Equation 5:

$$NC = \alpha * \text{Feature Matching Error} + C \quad (5)$$

where NC denotes noise covariance, C is a constant, α is a coefficient, and Feature Matching Error indicates an error between a pose of the mobile robot 100 estimated at time t by the odometer 120 and a pose of the mobile robot 100 estimated based on a feature extracted from an upward image.

If the pose of the mobile robot 100 estimated between the time t−1 and the time t by the odometer 120 is different from a pose Encoder Information of the mobile robot 100 estimated by an encoder and a pose Gyro Information of the mobile robot 100 estimated by a gyroscope The pose-estimation unit 310, the noise covariance of a particle may be calculated, as indicated by Equation 6:

if (|Gyro Information−Encoder Information|<σ)then
Straight Advance $NC=\beta*C$ else Rotation
$NC=\gamma*C$ (6)

where σ is a threshold and β and γ are coefficients. The coefficients β and γ may have a value greater than 1 for the purpose of noise-covariance extension.

For example, if there is a difference between the amount of rotation of a first encoder in a driving wheel of the mobile robot 100 and the amount of rotation of a second encoder in a caster of the mobile robot 100, it may be determined that the mobile robot 100 has slipped on the floor while traveling. The amount of rotation of the first encoder may be different from the amount of rotation of a second encoder when the mobile robot 100 travels on a carpeted floor or on a slippery floor. It may be determined whether the mobile robot 100 has slipped on the floor while traveling from one place to another in various manners other than that set forth herein.

If it is determined that the mobile robot 100 has slipped on the floor and the difference between the pose of the mobile robot 100 estimated by a gyroscope and the pose of the mobile robot 100 estimated by an encoder is less than a predefined threshold σ, it may be determined that the mobile robot 100 has slipped on the floor while making a straight advance, i.e., that a straight advance slip has occurred, and then the noise covariance of a particle may be extended toward the direction of the straight advance of the mobile robot 100. Likewise, if it is determined that the mobile robot 100 has slipped on the floor and the difference between the pose of the mobile robot 100 estimated by a gyroscope and the pose of the mobile robot 100 estimated by an encoder is greater than the predefined threshold σ, it may be determined that the mobile robot 100 has slipped on the floor while rotating, i.e., that a rotation slip has occurred, and then, the noise covariance of a particle may be extended toward the direction of the rotation of the mobile robot 100. If the pose of the mobile robot 100 changes due to the movement of the mobile robot 100 during the period between the time t−1 and the time t, the pose of the mobile robot 100 may be updated by adding up a pose of the mobile robot 100 detected at time t−1 by the odometer 120 and noise that follows a Gaussian distribution within a noise covariance range of a particle.

The pose of a particle at time t may be estimated using Equation 7:

$x_t^{(i)} = x_{t-1}^{(i)} + \Delta x_{t-1} + \Delta C^{(i)}$ (7)

where i denotes a particle index, $x_t$ indicates the pose of the mobile robot 100 at time t, $x_{t-1}$ indicates the pose of the mobile robot 100 at time t−1, $\Delta x_{t-1}$ indicates a variation in the pose of the mobile robot 100 detected between the time t−1 and time t by the odometer 120, and $\Delta C^{(i)}$ indicates noise that follows a Gaussian distribution within a noise covariance range of each particle during the period between time t−1 and time t.

The estimation of the current pose of a particle may be affected by the properties of the surface of a floor. Thus, it may be difficult to properly estimate the current pose of a particle for different types of floors simply by using a fixed noise covariance. According to the embodiment of FIG. 3, even if an error of the odometer 120 increases due to a slip on the floor, it is possible to effectively estimate the current pose of a particle using noise that can compensate for an increase in the error of the odometer 120.

The sampling unit 320 randomly samples N particles. When a time-count value increases by 1, the sampling unit 320 abandons particles with relatively low weights, and performs redundant sampling on particles with relatively high weights, thereby maintaining the total number of particles. This process is referred to as resampling. That is, the sampling unit 320 performs sampling once and then performs resampling a plurality of number of times.

An initial random sampling operation is an operation for selecting N arbitrary points or N particles near an initial position of the mobile robot 100. The initial random sampling operation may be represented by Equation (8):

$S_0 = \{(x_0^{(j)}, w_0^{(j)}) | j=1, \ldots, N\}$ (8)

where $x_0^{(j)}$ indicates an initial position of the mobile robot 100 for a j-th particle and $w_0^{(j)}$ indicates an initial weight for the j-th particle regarding the pose of the mobile robot 100. The weight $w_0^{(j)}$ may be uniformly set to a value of 1/N for all particles.

The sampling unit 320 resamples N samples from an existing particle set $S_{t-1}$ when a time-count value increases.

Whenever the time count value increases, the weight-calculation unit 330 calculates a weight $w_t^{(j)}$ for the j-th particle, and updates the weight $w_t^{(j)}$ with the result of the calculation.

If there are N particles, each of the N particles may be represented by $(x_t^{(i)}, w_t^{(i)})$ where i is an index value ranging from 0 to N, $x_t^{(i)}$ indicates a feasible pose of the mobile robot 100 at time t, and $w_t^{(i)}$ indicates the probability or weight of the feasible mobile robot pose $x_t^{(i)}$.

The higher the probability of the feasible mobile robot pose $x_t^{(i)}$ coinciding with an actual pose of the mobile robot 100, the higher the weight $w_t^{(i)}$. Therefore, the higher the weight $w_t^{(i)}$, the more likely the mobile robot 100 is to have the feasible mobile robot pose $x_t^{(i)}$.

Whenever the mobile robot 100 captures a new image, the weight-calculation unit 330 calculates the weight of a particle based on the new image. Since an encoder produces an accumulated error, it is necessary to calculate again the weights of particles after the feature-matching unit 210 performs feature matching.

The weight $w_t^{(i)}$ may be calculated again using Equation (9):

$$w_t^{(j)} = \frac{p(y_t | x_t^{(j)}) p(x_t^{(j)} | \bar{x}_{t-1}^{(j)}, u_{t-1}) p(\bar{x}_{t-1}^{(j)} | Y^{t-1})}{p(x_t^{(j)} | \bar{x}_{t-1}^{(j)}, u_{t-1}) p(\bar{x}_{t-1}^{(j)} | Y^{t-1})} = p(y_t | x_t^{(j)})$$ (9)

where $y_t$ indicates an actual position of the mobile robot 100 at time t, $x_t^{(j)}$ indicates an estimated position of a particle, $w_t^{(j)}$ indicates the probability of the estimated particle position $x_t^{(j)}$ coinciding with the actual mobile robot position $y_t$. The actual mobile robot position $y_t$ may be determined using a number of features that are matched by the feature-matching unit 210.

As described above, the weight-calculation unit 330 calculates the weights of a plurality of particles, and resamples N particles from the plurality of particles according to the results of the calculation. As a result of the resampling, particles with lower weights are eliminated or updated with particles with higher weights, thereby updating the pose of the mobile robot 100. Therefore, the higher the weights of particles, the more likely a current estimate of the pose of the mobile robot 100 is to be correct, and the more likely a feature observed by the mobile robot 100 is to be accurate. That is, it is possible to accurately build a map using particles with high weights.

The term "module," as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 7:
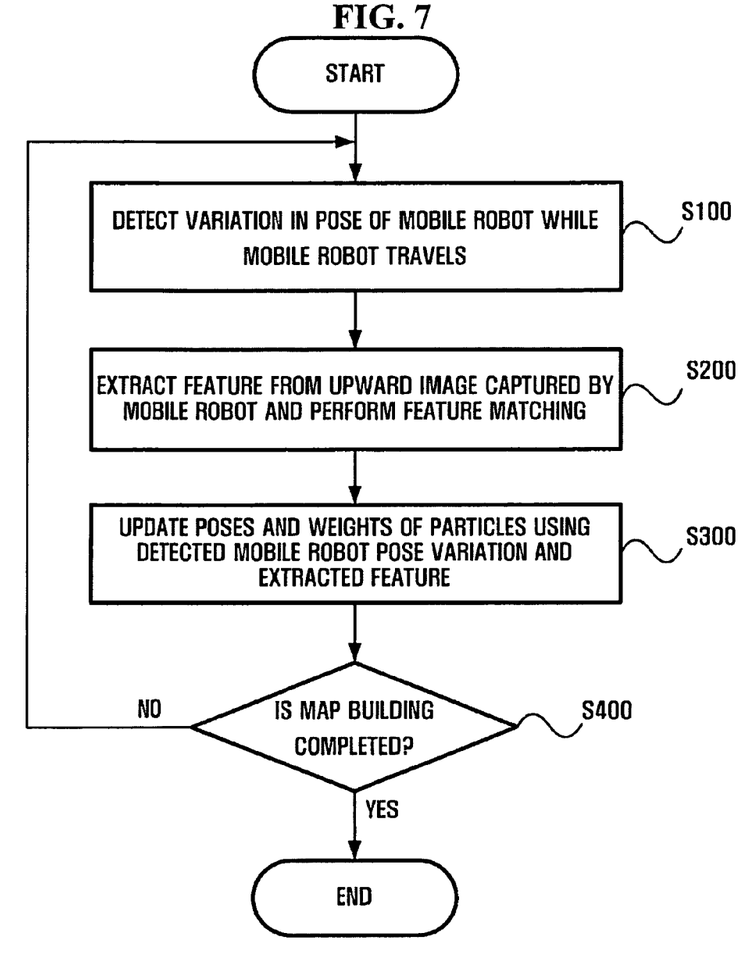
FIG. 7 is a flowchart illustrating a method of estimating the pose of a mobile robot using a particle filter, according to an embodiment of the present invention.

FIG. 7 is a flowchart illustrating a method of estimating the pose of a mobile robot using a particle filter, according to an embodiment of the present invention. Referring to FIG. 7, when the mobile robot 100 begins to travel, the odometer 120 detects a variation in the pose of the mobile robot 100 S100. The odometer 120 may detect the amount of movement of the mobile robot 100 using an encoder or a gyroscope. The encoder or the gyroscope calculates the amount of movement of the mobile robot 100 using an integral calculus, and may thus accumulate an error as the amount of movement of the mobile robot 100 increases.

Thereafter, an upward image is captured using the camera 130, a feature is extracted from the upward image, and feature matching is performed on the feature S200. Examples of the feature include a line with multiple feature points as well as a typical feature point.

The extraction of a feature from an upward image may be performed using the Harris corner detection method, the split-and-merge algorithm, or the MSER technique. In the MSER technique, in particular, a line or a point may be extracted from the contour of a closed region as a feature.

It is determined whether a current feature extracted from a current upward image is identical to a previous feature extracted from a previous upward image by performing feature matching. If the current feature is determined to be identical to the previous feature, the previous feature may be updated with the current feature. In contrast, if the current feature is determined not to be identical to the previous feature, the current feature may be stored as a new feature. In this manner, a map may be built.

Each particle includes information regarding the pose of the mobile robot 100 and feature information. Feature information may include the position and covariance of a feature and a local image corresponding to the feature. A local image is an N×M portion of an upward image captured by the camera 130 and includes a feature. It is possible to reduce the amount of memory usage and computation required, and thus facilitate the realization of an embedded system for a mobile robot by generating a number of local images corresponding to the number of features and sharing the local images between a plurality of particles.

Referring to FIG. 7, the poses and weights of particles are updated using the result of the detection performed in operation S100 and the features obtained in operation S200 (S300). The particles are hypothesized samples that are virtually created around the mobile robot 100.

A variation in the pose of a particle may be calculated by adding up a variation in the pose of the mobile robot 100 detected by the odometer 120 and random noise within a noise covariance range. If the mobile robot pose variation detected by the odometer 120 is erroneous due to a slip on the floor, noise covariance may be variably adjusted using Equations 5 and 6. In this manner, it is possible to reduce an error associated with the estimation of the pose of each particle at a current time by effectively estimating a variation in the pose of the mobile robot 100 regardless of whether the mobile robot pose variation detected by the odometer 120 is erroneous.

As the probability that the pose of a particle is accurate increases, the weight of the particle gradually increases. The weight of a particle may be calculated using Equation 9. According to an embodiment of the present invention, particles with relatively low weights may be abandoned, and particles with relatively high weights may be recreated.

Referring to FIG. 7, it is determined whether the construction of a map is completed S400. If the construction of a map is completed, the method ends. In contrast, if the construction of a map is yet to be completed, the method returns to operation S100. It may be determined that the construction of a map is completed if no features have been recognized for at least a predetermined amount of time or for as long as the mobile robot 100 has traveled (more than a predetermined distance) or if the positions of previously-recognized features converge.

As described above, according to the present invention, it is possible to reduce the amount of memory usage and computation required to recognize features extracted from an image.

In addition, according to the present invention, it is possible to effectively estimate the pose of a mobile robot regardless of an error caused by an odometer.

Moreover, according to the present invention, it is possible to accurately estimate the pose of a mobile robot and effectively construct a map even when the mobile robot is in an environment lacking prominent feature points, by performing feature matching using not only feature points but also lines with multiple feature points as features.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for estimating a pose of a mobile robot, comprising:
   an odometer which detects a variation in the pose of a mobile robot;
   a feature-processing module to extracts at least one feature from an upward image captured by the mobile robot; and
   a particle filter module to determines current poses and weights of a plurality of particles by applying the mobile robot pose variation detected by the odometer and the at least one feature extracted by the feature-processing module to previous poses and weights of the particles,
   wherein the at least one extracted feature is shared between each of the plurality of particles.

2. The apparatus of claim 1, wherein the feature-processing module comprises:
   a feature-extraction unit which extracts a current feature from an image captured at a current time by the mobile robot; and
   a feature-matching unit which determines whether the current feature is identical to a previous feature extracted at a previous time.

3. The apparatus of claim 2, wherein the feature-matching unit determines whether the current feature is identical to the previous feature by sharing a local image including the feature extracted by the feature-processing module for each of the particles.

4. The apparatus of claim 3, wherein the feature-matching unit comprises a data structure which includes coordinates of a feature and a local image including the feature.

5. The apparatus of claim 1, wherein the feature extracted by the feature-processing module is a feature point or a line with multiple feature points.

6. The apparatus of claim 1, wherein the feature extracted by the feature-processing module is a line or a point extracted from a contour obtained using the Maximally Stable Extremal Region (MSER) technique.

7. The apparatus of claim 1, wherein the particle filter module comprises:
a pose-estimation unit which determines the current poses of the particles by applying the mobile robot pose variation detected by the odometer to the particles; and
a weight-calculation unit which compares the current poses of the particles with a pose of the mobile robot estimated based on the feature extracted by the feature-processing module and allocates high weights to particles whose current poses are similar to the estimated mobile robot pose.

8. The apparatus of claim 7, wherein the particle filter module further comprises a sampling unit which resamples a number of particles according to the weights of the particles.

9. The apparatus of claim 7, wherein the pose-estimation unit calculates a variation in the pose of a particle by adding up the mobile robot pose variation detected by the odometer and random noise within a noise covariance range.

10. An apparatus for estimating a pose of a mobile robot, comprising:
an odometer which detects a variation in the pose of a mobile robot;
a feature-processing module which extracts at least one feature from an upward image captured by the mobile robot; and
a particle filter module which determines current poses and weights of a plurality of particles by applying the mobile robot pose variation detected by the odometer and the feature extracted by the feature-processing module to previous poses and weights of the particles,
wherein the particle filter module comprises:
a pose-estimation unit which determines the current poses of the particles by applying the mobile robot pose variation detected by the odometer to the particles; and
a weight-calculation unit which compares the current poses of the particles with a pose of the mobile robot estimated based on the feature extracted by the feature-processing module and allocates high weights to particles whose current poses are similar to the estimated mobile robot pose,
wherein the particle filter module further comprises a sampling unit which resamples a number of particles according to the weights of the particles,
wherein the pose-estimation unit increases covariance if a difference between the mobile robot pose variation detected by the odometer and a variation in the pose of the mobile robot estimated based on the feature extracted by the feature-processing module is greater than a predefined threshold.

11. An apparatus for estimating a pose of a mobile robot, comprising:
an odometer which detects a variation in the pose of a mobile robot;
a feature-processing module which extracts at least one feature from an upward image captured by the mobile robot; and
a particle filter module which determines current poses and weights of a plurality of particles by applying the mobile robot pose variation detected by the odometer and the feature extracted by the feature-processing module to previous poses and weights of the particles,
wherein the particle filter module comprises:
a pose-estimation unit which determines the current poses of the particles by applying the mobile robot pose variation detected by the odometer to the particles; and
a weight-calculation unit which compares the current poses of the particles with a pose of the mobile robot estimated based on the feature extracted by the feature-processing module and allocates high weights to particles whose current poses are similar to the estimated mobile robot pose,
wherein the particle filter module further comprises a sampling unit which resamples a number of particles according to the weights of the particles,
wherein the pose-estimation unit increases straight advance noise covariance if it is determined that the mobile robot has slipped on a floor and a difference between a variation in the pose of the mobile robot detected by a gyroscope and a variation in the pose of the mobile robot detected by an encoder is less than a predefined threshold; and increases rotation noise covariance if it is determined that the mobile robot has slipped on the floor and the difference between the mobile robot pose variation detected by the gyroscope and the mobile robot pose variation detected by the encoder is greater than the predefined threshold.

12. The apparatus of claim 1, wherein the odometer comprises at least one of an encoder and a gyroscope.

13. A method of estimating a pose of a mobile robot, comprising:
detecting a variation in the pose of a mobile robot;
extracting at least one feature from an upward image captured by the mobile robot; and
determining current poses and weights of particles by applying the detected mobile robot pose variation and the at least one extracted feature to previous poses and weights of the particles,
wherein the at least one extracted feature is shared between each of the plurality of particles.

14. The method of claim 13, wherein the extracting the at least one feature comprises:
extracting a current feature from an image captured at a current time by the mobile robot; and
determining whether the current feature is identical to a previous feature extracted at a previous time.

15. The method of claim 14, wherein the determining whether the current feature is identical comprises sharing a local image including the extracted feature between the particles.

16. The method of claim 13, wherein the extracted feature is a line or a point extracted from a contour obtained using the MSER technique.

17. The method of claim 13, wherein the determining current poses and weights comprises
determining the current poses of the particles by applying the detected mobile robot pose variation to the particles; and
comparing the current poses of the particles with a pose of the mobile robot estimated based on the extracted feature, and allocating high weights to particles whose current poses are similar to the estimated mobile robot pose.

18. The method of claim 17, wherein the determining the current poses of the particles comprises calculating a variation in the pose of a particle by adding up the detected mobile robot pose variation and random noise within a noise covariance range.

19. A method of estimating a pose of a mobile robot, comprising:
   detecting a variation in the pose of a mobile robot;
   extracting at least one feature from an upward image captured by the mobile robot; and
   determining current poses and weights of particles by applying the detected mobile robot pose variation and the extracted feature to previous poses and weights of the particles,
   wherein the determining current poses and weights comprises
   determining the current poses of the particles by applying the detected mobile robot pose variation to the particles; and
   comparing the current poses of the particles with a pose of the mobile robot estimated based on the extracted feature, and allocating high weights to particles whose current poses are similar to the estimated mobile robot pose,
   wherein the determining the current poses of the particles comprises calculating a variation in the pose of a particle by adding up the detected mobile robot pose variation and random noise within a noise covariance range,
   wherein the determining the current poses of the particles further comprises increasing covariance if a difference between the detected mobile robot pose variation and the estimated mobile robot pose is greater than a predefined threshold.

20. A method of estimating a pose of a mobile robot, comprising:
   detecting a variation in the pose of a mobile robot;
   extracting at least one feature from an upward image captured by the mobile robot; and
   determining current poses and weights of particles by applying the detected mobile robot pose variation and the extracted feature to previous poses and weights of the particles,
   wherein the determining current poses and weights comprises
   determining the current poses of the particles by applying the detected mobile robot pose variation to the particles; and
   comparing the current poses of the particles with a pose of the mobile robot estimated based on the extracted feature, and allocating high weights to particles whose current poses are similar to the estimated mobile robot pose,
   wherein the determining the current poses of the particles comprises calculating a variation in the pose of a particle by adding up the detected mobile robot pose variation and random noise within a noise covariance range,
   wherein the determining the current poses of the particles further comprises, if it is determined that the mobile robot has slipped on a floor:
   increasing straight advance noise covariance if a difference between a variation in the pose of the mobile robot detected by a gyroscope and a variation in the pose of the mobile robot detected by an encoder is less than a predefined threshold; and
   increasing rotation noise covariance if the difference between the mobile robot pose variation detected by the gyroscope and the mobile robot pose variation detected by the encoder is greater than the predefined threshold.

* * * * *